(No Model.)
F. BAIN.
DYNAMO OR MAGNETO ELECTRIC GENERATOR.
No. 287,608. Patented Oct. 30, 1883.
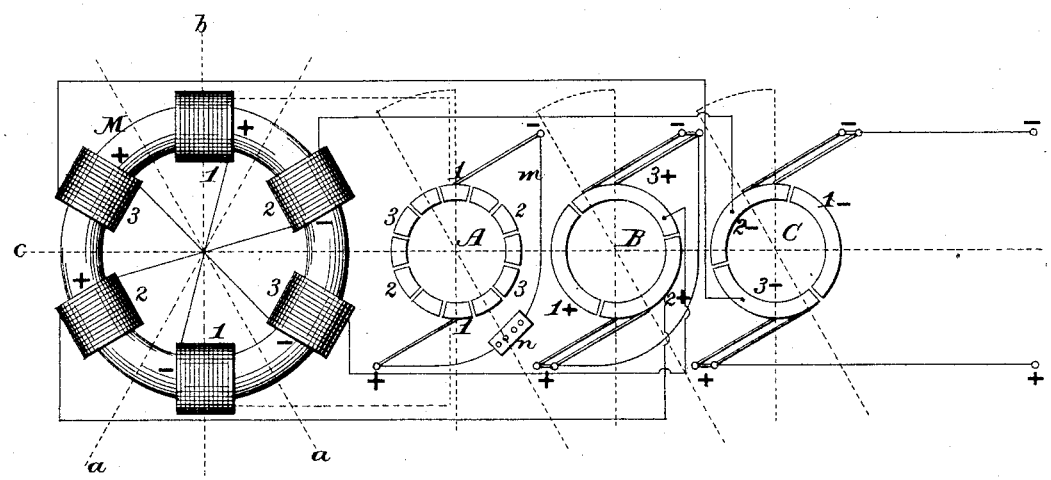
Attest:
Cour? A. Cooper
H. E. Hansmann.
Inventor:
Foré Bain
By Foster & Freeman
attys

United States Patent Office.

FORÉE BAIN, OF CHICAGO, ILLINOIS, ASSIGNOR TO THE BAIN ELECTRIC COMPANY, OF SAME PLACE.

DYNAMO OR MAGNETO ELECTRIC GENERATOR.

SPECIFICATION forming part of Letters Patent No. 287,608, dated October 30, 1883.

Application filed September 25, 1883. (No model.)

*To all whom it may concern:*

Be it known that I, FORÉE BAIN, a citizen of the United States, and a resident of Chicago, Cook county, Illinois, have invented certain new and useful Improvements in Dynamo or Magneto Electric Machines, of which the following is a specification.

My invention relates to dynamo or magneto electric generators, and has for its object to utilize all the effective current generated by the revolving armature in the circuit external to the armature, to reduce the internal resistance of the armature to a minimum, and to withdraw the useless or practically non-contributing bobbins or coils from the working-circuit of the machine; and to accomplish these ends my present invention consists in the manner of connecting the various bobbins or coils of the armature through the commutators and brushes with the working or external circuit, hereinafter set forth. In my application No. 105,494, heretofore filed, I have described and claimed one way of accomplishing this end, in which the coils were connected in series and in multiple arc, according to the potential of the field of force through which they were passing. In other words, the coils cutting the larger number of lines of magnetic force were connected in series, the coils cutting a lesser number of lines of magnetic force were connected in multiple arc, and those passing the practically-neutral points of the field of magnetic force were short-circuited. In my present invention, instead of short-circuiting the coils passing at or near the neutral fields of force, I momentarily "long" circuit them, or connect them to a circuit of high resistance. I have found that the coils passing the practically-neutral points may, in fact, generate more or less current, and when the circuit of these coils is short and of practically no resistance, according to the well-known law expressed in the equation $C = \frac{E}{R}$, whatever current is generated is relatively greater than it should be. As this current is unavailable for practical purposes, and only serves to retard the rotation of the machine and to use up portions of the mechanical force necessary to drive the machine, without assisting the working or useful current, it is better to prevent the generation of these greater currents, and reduce the currents generated to a minimum. In order to do this, I connect the coils passing the practically-neutral point by a long circuit, or a circuit of relatively very high resistance.

In order to more particularly describe this invention, reference is made to the accompanying drawing, in which the figure illustrates diagrammatically my invention applied to one form of machine—such, for instance, as is shown in my application before referred to.

In the drawing, the ring M is shown as carrying six coils connected in pairs, the terminals being connected to the segments upon the various commutators A B C. The commutators may be constructed as explained more particularly in my former case, in which A has twice as many segments as there are coil terminals, each terminal being connected to one of the segments, and each alternate segment being an insulated plate. For the sake of clearness, only two terminals are shown as being connected to this commutator, and those are the terminals of the coils 1+ and 1—, which are represented as passing at or near the neutral line $b$ of the machine. The commutators B C may also be of the form shown, each having as many segments as there are pairs of coil terminals, one terminal of each pair being connected to a segment of each commutator-ring B and C. The brushes of these commutators are shown as consisting of double brushes, and are connected together and to the main working-circuit, so that the coils 2+ 2— and 3+ 3—, passing through fields of substantially equal potential, are all connected in series circuit in a manner readily understood. The brushes resting on the segments of commutator A, connected to the terminals of the coils 1+, and 1—, are shown as connected by the conductor $m$, in which is included the resistance $n$. This resistance may be in any well-known form, adjustable or otherwise, but must be, comparatively to the resistance of the external circuit of the machine, very high.

The operation of this machine will be apparent. The coils generating useful currents are connected to the main or working circuit. In this instance I have shown them as being connected in series; but it is apparent they may be connected in series in part and in mutiple arc in part, and the current of those connected in series may pass through the coils connected in multiple arc, as set forth in my case above referred to; or they may be connected in any other well-known manner, as the operation of my present invention does not depend upon the particular manner the coils generating useful currents are connected. The coils passing through the fields of low or practically no potential are connected to the commutator A, and the segments to which the terminals are connected are in contact with the brushes the ends of which are connected by the long circuit, or circuit of comparatively very high resistance, $m$. If these brushes were short-circuited, as shown in my prior case, the current generated, depending upon the equation $C=\frac{E}{R}$, in which R is comparatively very small, or $nil$, would be abnormally increased, and, not being in the working-circuit, would only use up the mechanical energy necessary to drive the generator, without proportionately increasing the efficiency of the generator, but, on the contrary, tending to retard it and lessen its relative efficiency. By making the R (in the drawing represented by $m\ n$) very high, C is necessarily reduced to its minimum, or practically $nil$. Thereby the coils, not contributing to the working or effective circuit, are generating the smallest practical amount of current, and consequently offering the least resistance to the mechanical force driving the machine, and at the same time, being connected by the high-resistance circuit $m\ n$, the currents from the active or efficient coils will not flash through them, producing sparks, nor will they offer unnecessary resistance to the working-circuit, as in the Pacinotti type of machine, nor cause the working-current to be wavy or unsteady.

It will be understood that I do not limit myself to any particular type or construction of machine or manner of connecting the effective coils, as that forms no part of my present invention; but I have shown it in the manner set forth, as being the most convenient to clearly illustrate the invention.

The advantages of my present invention are so apparent to those skilled in the art as to need no mention here.

Having thus described my invention, what I claim is—

1. The method, substantially as herein set forth, of increasing the efficiency of a dynamo or magneto electric generator, which consists in connecting the coils passing through fields of force of small potential by a circuit of high resistance, whereby the amount of ineffective current generated is reduced, and at the same time sparking or flashing is prevented.

2. The method, substantially as herein described, of connecting the coils of an electric generator, which consists in connecting the coils generating effective currents to the working circuit or circuits of the machine, and connecting the coils generating ineffective currents to a long circuit, or a circuit of comparative high resistance, whereby the efficiency of the machine is increased and flashing is prevented.

3. The combination, in an electric generator, with the armature-coils, of commutators and connections, substantially as described, the arrangement being such that the coils passing through fields of force of small or no potential are connected by a circuit of high resistance.

4. The combination, in an electric generator, with the armature-coils, of a commutator and connections, whereby the coils generating an ineffective current are long-circuited, substantially as described.

5. The combination, in an electric generator, with an armature, of the coils generating currents of little strength or intensity, a commutator to which such coils are connected, and brushes which are connected by a long circuit, or a circuit containing a high resistance, substantially as described.

In testimony whereof I have signed my name to this specification in the presence of two subscribing witnesses.

FORÉE BAIN.

Witnesses:
W. H. FRENCH,
R. WATERMAN.